(12) United States Patent
San Martin et al.

(10) Patent No.: US 11,002,876 B2
(45) Date of Patent: May 11, 2021

(54) METHOD FOR ESTIMATING FORMATION PARAMETERS FROM IMAGINARY COMPONENTS OF MEASURED DATA

(75) Inventors: Luis Emilio San Martin, Houston, TX (US); Dagang Wu, Katy, TX (US)

(73) Assignee: Halliburton Energy Services Inc., Houston, TX (US)

( * ) Notice: Subject to any disclaimer, the term of this patent is extended or adjusted under 35 U.S.C. 154(b) by 1057 days.

(21) Appl. No.: 14/114,742

(22) PCT Filed: May 3, 2011

(86) PCT No.: PCT/US2011/034994
§ 371 (c)(1),
(2), (4) Date: Oct. 29, 2013

(87) PCT Pub. No.: WO2012/150934
PCT Pub. Date: Nov. 8, 2012

(65) Prior Publication Data
US 2014/0067272 A1   Mar. 6, 2014

(51) Int. Cl.
*G01V 3/38*   (2006.01)
*G01V 3/28*   (2006.01)

(52) U.S. Cl.
CPC . *G01V 3/38* (2013.01); *G01V 3/28* (2013.01)

(58) Field of Classification Search
CPC .................................. G01V 3/28; G01V 3/18
USPC ..................................... 324/334, 339; 702/2
See application file for complete search history.

(56) References Cited

U.S. PATENT DOCUMENTS

| | | | | |
|---|---|---|---|---|
| 3,706,025 | A | * 12/1972 | Regat | G01V 3/28 324/339 |
| 4,359,687 | A | * 11/1982 | Vinegar | G01V 3/24 324/366 |
| 4,857,852 | A | * 8/1989 | Kleinberg | G01V 3/28 324/339 |
| 5,600,246 | A | 2/1997 | Forgang et al. | |
| 5,757,191 | A | 5/1998 | Gianzero | |
| 5,966,013 | A | 10/1999 | Hagiwara | |
| 6,393,364 | B1 | * 5/2002 | Gao | E21B 47/026 702/7 |

(Continued)

OTHER PUBLICATIONS

Extended Search Report, European Application No. 11864656, dated Sep. 21, 2015, 7 pages.

(Continued)

*Primary Examiner* — Regis J Betsch
*Assistant Examiner* — Kaleria Knox
(74) *Attorney, Agent, or Firm* — Haynes and Boone, LLP (57) ABSTRACT

A system and method for determining formation parameters is provided. The system includes an induction logging tool having a plurality of transmitter coils. The induction logging tool further includes a plurality of receiver coils, each of the receiver coils being spaced apart from the transmitter coils by a predetermined distance and receiving a response signal from the formation. The system includes circuitry coupled to the induction logging tool, the circuitry determining voltages induced in the plurality of receiver coils by the response signal. The circuitry separates real or in-phase portions of the determined voltages from imaginary of ninety degrees out of phase portions of the determined voltages and determines formation parameters using imaginary portions of the measured voltages.

20 Claims, 7 Drawing Sheets

(56) References Cited

U.S. PATENT DOCUMENTS

| | | |
|---|---|---|
| 6,556,016 B2 | 4/2003 | Gao et al. |
| 6,591,194 B1 | 7/2003 | Yu et al. |
| 6,727,706 B2 | 4/2004 | Gao et al. |
| 6,969,994 B2 | 11/2005 | Minerbo et al. |
| 7,386,430 B2 | 6/2008 | Barber et al. |
| 7,536,261 B2 | 5/2009 | Omeragic et al. |
| 7,557,580 B2 | 7/2009 | Bittar |
| 7,737,697 B2 | 6/2010 | Yu et al. |
| 2004/0108853 A1 | 6/2004 | Rosthal |
| 2005/0083061 A1* | 4/2005 | Tabanou .................. G01V 3/28 |
| | | 324/334 |
| 2005/0083063 A1 | 4/2005 | Omeragic et al. |
| 2005/0122116 A1 | 6/2005 | Liming et al. |
| 2010/0082255 A1 | 4/2010 | Davydycheva et al. |

OTHER PUBLICATIONS

Office Action dated Mar. 27, 2015, in related Canadian Application No. 2,833,777.
International Preliminary Report on Patentability and the Written Opinion dated Nov. 14, 2013, in related International Application No. PCT/US2011/034994.
Examination Report dated May 9, 2014, in related Australian Application No. 20140512.
International Search Report and the Written Opinion dated Jul. 25, 2011, in related International Application No. PCT/US2011/034994, 9 pages.
Moran, J.H., et al, "Effects of formation anisotropy on resistivity-logging measurements," Geophysics, vol. 44, No. 7 (Jul. 1979); pp. 1266-1286 (21 Figs., 4 Tables).

\* cited by examiner

METHOD FOR ESTIMATING FORMATION PARAMETERS FROM IMAGINARY COMPONENTS OF MEASURED DATA

BACKGROUND

1.—Technical Field

Embodiments disclosed herein generally relate to the measurement of electrical characteristics of formations surrounding a borehole, and using the measured electrical characteristics to estimate additional, non-measured, formation parameters. In particular, the disclosed embodiments are related to estimating formation parameters using only the imaginary, or reactive, components of the measured data.

2.—Description of Related Art

Induction logging is important in the search for and recovery of subterranean petroleum deposits. In particular, induction logging is used to determine the resistivity, conductivity, and other parameters of earth formations surrounding a borehole. Induction logging involves using a transmitter to produce a field that is directed into the earth formations. The field induces eddy currents to flow in the formations and the response from the formation is measured by a receiver. Specific properties of the received signal can then be analyzed to determine specific formation properties which is logged at the surface as a function of the depth of the tool in the borehole.

In typical induction logging tools, the formation response to the resultant field can be difficult to measure because most of the signal at the receiver arrives directly from the transmitter to the receiver. This field that is received at the receiver directly from the transmitter is known as the direct signal. To allow for improved measurement of the formation response, the receiver is now typically made of two functional parts, a main portion of a receiver and a bucking portion of a receiver. In typical induction logging tools, the transmitter and receiver are one or more coils, and the bucking coil is wound in the opposite direction to the main receiver coil to cancel the direct signal.

The voltage generated by the direct signal has a phase offset of about 90 degrees with respect to the phase of the current in the transmitter, and contributes to the imaginary or reactive portion of the voltage measured in the receiver. Even though most processing algorithms are based substantially on the real part of the voltage and ignore the imaginary portion, it is still necessary to cancel the direct signal because it can be several orders of magnitude larger than the signal received from the formation and, thus, even small phase measurement errors of the direct signal can produce a significant deviation in the measurement of the real part of the measured voltage. In addition, any movement of the coils caused by change in temperature or mechanical vibration can produce additional direct imaginary or reactive parts of signals that are comparable in magnitude to the imaginary parts of signals that are normally generated by the formation. This makes it difficult to accurately measure the imaginary signals and, thus, the imaginary part of the signal is generally disregarded and not used.

However, even using the real part of the signal does not provide optimal results at all times. For example, when performing induction logging at or near boundaries between geological beds, known as bed boundaries, formations often have different resistivities on either side of the bed boundary such that the measure voltages exhibit what is known as horns. As defined in, for example, U.S. Pat. No. 5,241,273 to Luling, horns are defined as "a sharp local maximum with a peak resistivity at least twice the resistivity on either side of the local maximum." These horns grow as the dip angle of the formation increases, and may provide unsuitable results and errors near bed boundaries.

Consequently, there is a need to provide an induction logging tool that is capable of producing more accurate results of formation characteristics at or near bed boundaries.

BRIEF SUMMARY

Consistent with some embodiments, there is provided a system for determining formation parameters. The system includes an induction logging tool that includes a plurality of transmitter coils, the plurality of transmitter coils transmitting an induction signal into the formation. The induction logging tool further includes a plurality of receiver coils, each of the receiver coils being spaced apart from the transmitter coils by a predetermined distance and receiving a response signal from the formation. The system also includes circuitry coupled to the induction logging tool, the circuitry determining voltages induced in the plurality of receiver coils by the response signal, wherein the circuitry is further configured to separate real portions of the determined voltages from imaginary portions of the determined voltages and determine formation parameters using imaginary portions of the measured voltages, wherein the real portions of the determined voltages are in phase with a current on at least one of the transmitter coils and the imaginary portions of the determined voltages are ninety degrees out of phase with the current on the at least one transmitter coil.

A method of determining selected parameters of a formation is also provided. The method includes transmitting, by a plurality of transmitters of an induction logging tool, an induction signal into the formation and receiving, by a plurality of receivers of the induction logging tool, a response signal from the formation. The method further includes measuring voltages induced in the plurality of receivers by the response signal and separating, by circuitry, imaginary components of the measured voltages from real components of the measured voltages, wherein the real components of the determined voltages are in phase with a current on at least one of the transmitters and the imaginary components of the determined voltages are ninety degrees out of phase with the current on the at least one transmitter. The method also includes determining, by the circuitry, selected parameters of the formation using the imaginary components of the measured voltages.

These and other embodiments will be described in further detail below, with reference to the following drawings.

BRIEF DESCRIPTION OF THE DRAWINGS

Wherever possible, the same reference numbers are used throughout the drawings to refer to the same or like elements.

DETAILED DESCRIPTION

Figure 1:
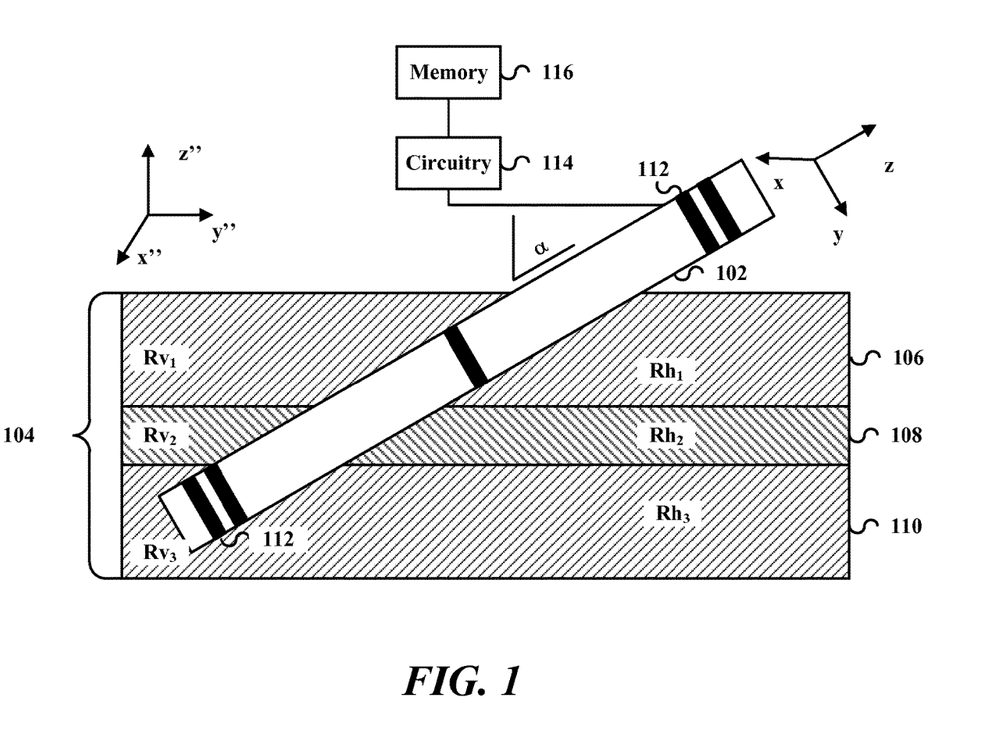
FIG. 1 illustrates an induction logging tool in a formation, consistent with some embodiments.

FIG. 1 illustrates an induction logging tool in a formation, consistent with some embodiments. As shown in FIG. 1, induction logging tool 102 is oriented in a formation 104 at a dip angle α with respect to formation 104. Formation 104 includes a first layer 106 having a first horizontal resistivity $R_{h1}$, a second layer 108 having a second horizontal resistivity $R_{h2}$, and a third layer 110 having a third resistivity $R_{h3}$. Consistent with some embodiments, induction logging tool 102 may include one or more receivers/transmitter pairs or triads 112 spaced along tool 102. Receiver/transmitter pairs or triads 112 may be used to induce a field into formation 104 and receive a voltage representative of certain parameters of formation 104 including but not limited to dip angle α, first, second, and third horizontal resistivities $R_{h1}$, $R_{h2}$, and $R_{h3}$, and a strike angle β (not shown). Induction logging tool 102 may be coupled to circuitry 114 for processing measurements made by one or more receiver/transmitter pairs or triads 112. Circuitry 114 may be located within induction logging tool 102 in some embodiments, while in other embodiments circuitry 114 may be located at the surface or at a location remote from the dig site. Consistent with some embodiments, circuitry 114 may be a processing device, such as an embedded processor or computing device. In some embodiments, circuitry 114 may be dedicated circuits or programmable devices designed to perform specific processing operations on measured signals. Consistent with some embodiments, memory 116 may be coupled to circuitry for storing the measured voltages and for storing instructions for processing measurements made by the one or more receiver/transmitter pairs or triads 112. Further consistent with some embodiments, induction logging tool 102 may be attached to a rotating drill string in a logging while drilling (LWD) or measuring while drilling (MWD) arrangement.

Typically, a formation model is used to interpret the logged voltage measurements to determine the formation parameters using circuitry 114. A typical model is a uniaxial anisotropy model that assumes that formation 104 is isotropic in the horizontal direction (parallel to the bedding plane) and anisotropic in the vertical direction (perpendicular to the bedding plane). By preparing a coordinate system specific to formation 104 such that the z-axis is perpendicular to layers 106-110, and the x- and y-axes are parallel to layers 106-110 allows for a conductivity tensor to be defined $$\sigma = \begin{bmatrix} \sigma_h & 0 & 0 \\ 0 & \sigma_h & 0 \\ 0 & 0 & \sigma_v \end{bmatrix}$$

where $\sigma_h$ is a horizontal conductivity of formation 104 and $\sigma_v$ is a vertical conductivity of formation 104.

Figure 2:
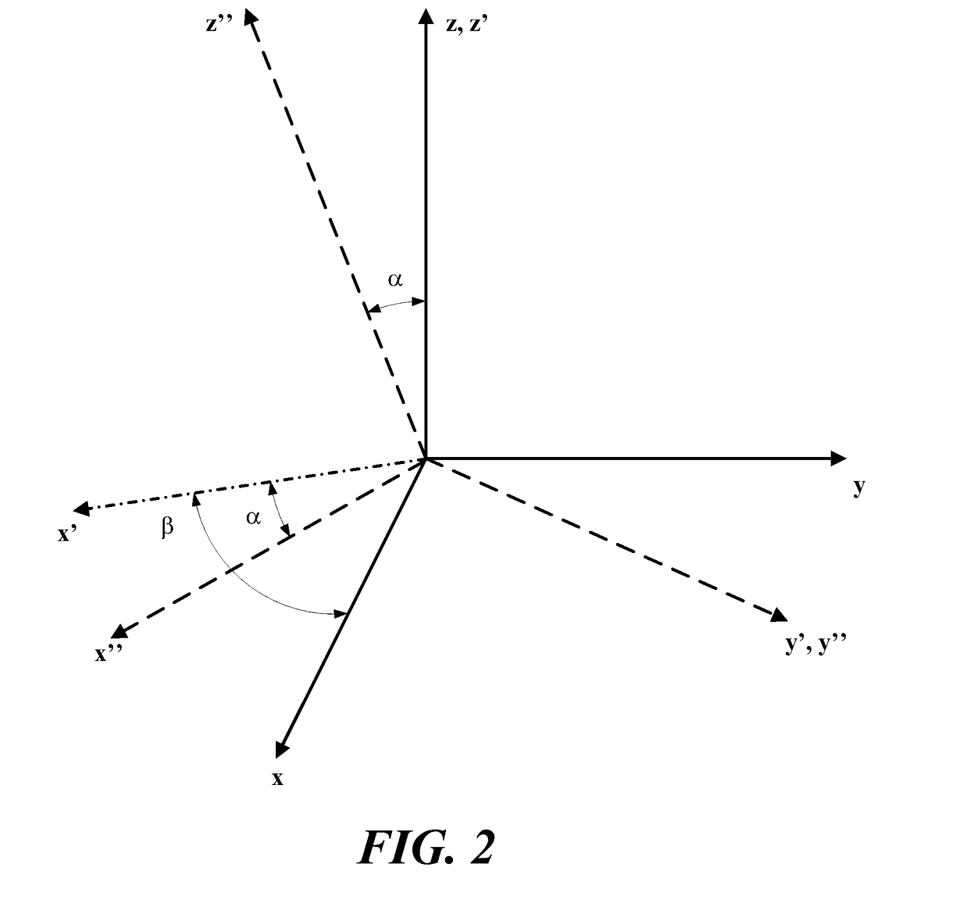
FIG. 2 illustrates a transformation from a coordinate system (x, y, z) of an induction logging tool to a coordinate system (x", y", z") of a formation.

However, the axes of the formation coordinate system typically do not correspond to the axes of the tool coordinate system. Indeed, as shown in FIG. 1, induction logging tool 102 has an axis of x, y, z, while formation has a different axis of x", y", z". Thus, in order to calculate the conductivity and other parameters a rotational transform can be defined. FIG. 2 illustrates a transformation from a coordinate system (x, y, z) of induction logging tool 102 to a coordinate system (x", y", z") of formation 104. The coordinate system is first rotated about the z-axis by the strike angle β, the strike angle β referring to an angle between the y-axis of the induction logging tool system of coordinates and a strike line of formation 104, the strike line being a line representing an intersection of formation 104 with a horizontal plane. The rotation about the strike angle β forms the coordinate system of x', y', and z'. This intermediate coordinate system is then further rotated about the y' axis by the dip angle α to obtain a coordinate system of formation 104 (x", y", z").

Of course, any vector v" in the coordinate system of formation 104 can be expressed in the coordinate system of induction logging tool 102 by another rotational transform:

$$v = Rv''$$

where the rotation transform matrix R is $$R = \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix}.$$

Figure 3:
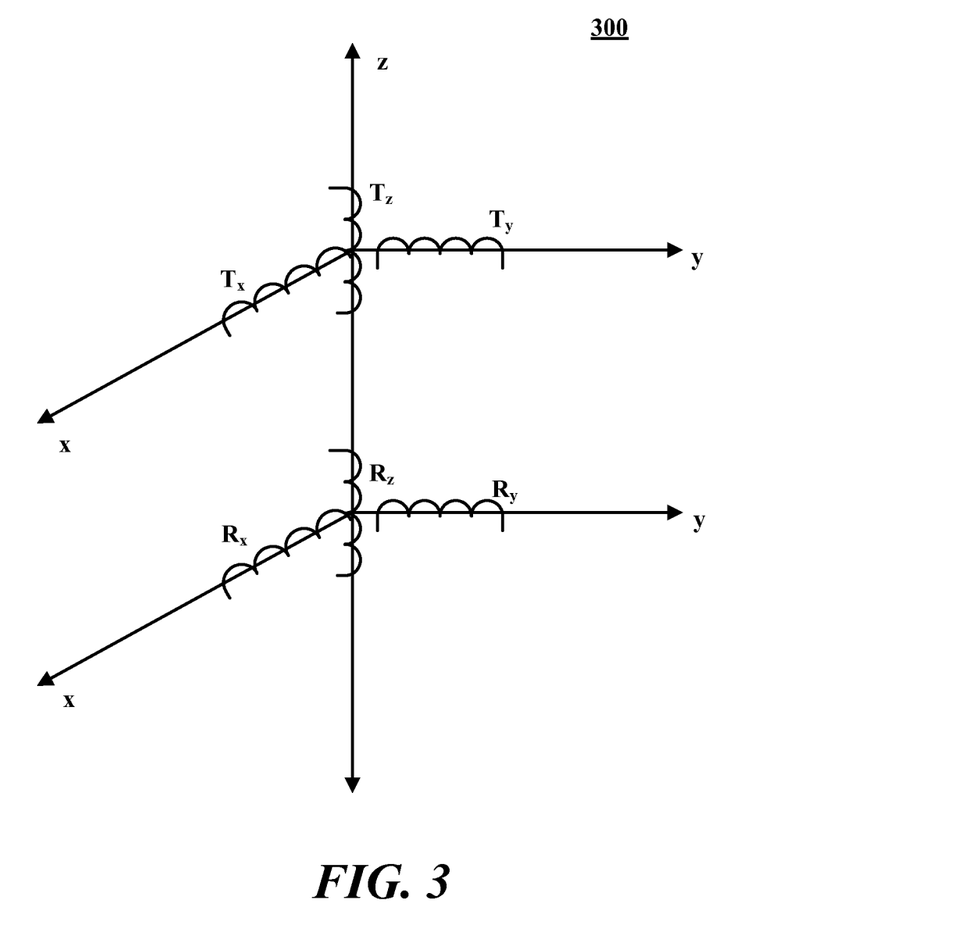
FIG. 3 illustrates a conceptual coil arrangement for an induction tool.

Following the definition of the rotational transform, the measurements of the induction tool can be explained. FIG. 3 illustrates a conceptual coil arrangement for an induction tool. Consistent with some embodiments, coil arrangement 300 may correspond to receiver/transmitter pairs or triads 112. Coil arrangement 300 includes a triad of transmitter coils $T_x$, $T_y$, and $T_z$, wherein each coil is oriented in a direction along a respective x, y, and z axis such that each of the axes are orthogonal with one another. Consistent with some embodiments, each transmitter coil, $T_x$, $T_y$, or $T_z$, operates at the same frequency and is operated one at a time such that at any time, only one of $T_x$, $T_y$, or $T_z$ transmitting a signal. Consistent with other embodiments, each transmitter coil $T_x$, $T_y$, and $T_z$ operates at different frequencies such that one or more transmitter coil $T_x$, $T_y$, or $T_z$ operate simultaneously. Coil arrangement 300 also includes a triad of receiver coils $R_x$, $R_y$, and $R_z$ wherein each coil is oriented in a direction along a respective x, y, and z, axis such that each of the axes are orthogonal with one another. Although FIG. 3 illustrates triads of transmitter and receiver coils arranged in three orthogonal orientations, the triads may be in other non-orthogonal orientations provided that the orientations of the coils are linearly independent on one another. In such linearly independent orientations the data may be transformed to an orthogonal system using well known methods. Coil arrangement 300 may also include one or more bucking receiver coils (not shown) between the transmitter coils and the receiver coils, wherein the bucking receiver coil is wound in an opposite direction to the main receiver coil to cancel the direct signal from the transmitter coils.

Consistent with some embodiments, receiver coils $R_x$, $R_y$, $R_z$ may be used to measure voltage indicative of formation parameters. The overall voltage detected by coil arrangement 300 ∇ may be defined as $V_{ij}$, which represents the voltage measured by the jth receiver from the ith transmitter. As discussed above, when the transmitter coils are operating at the same frequency, only one transmitter coil is operating at a time such that the receiver coils can differentiate the signals attributed to the active transmitter. Consequently, the voltage tensor may be defined as:

$$\bar{\bar{V}} = \begin{bmatrix} V_{xx} & V_{yx} & V_{zx} \\ V_{xy} & V_{yy} & V_{zy} \\ V_{xz} & V_{yz} & V_{zz} \end{bmatrix} \quad (1)$$

The diagonal components of the measured voltages in Equation (1) ($V_{xx}$, $V_{yy}$, and $V_{zz}$) will be heavily influenced by the direct signal, which will make it difficult to use the imaginary or reactive portion of the measured voltages in determining formation parameters. On the other hand, the off-diagonal terms ($V_{yx}$, $V_{xy}$, $V_{yz}$, $V_{zx}$, $V_{xz}$ and $V_{zy}$) will be relatively free from the direct signals, and the measurements of those components in vacuum is, with or without bucking coils, approximately zero. Thus, the imaginary or reactive portions of the measured off-diagonal voltages may be used in determining formation parameters that are relatively free from errors attributed to a strong measured direct signal Moreover, the imaginary or reactive portions of the measured voltages may be used to determine formation parameters in much the same way that the real portions of the measured voltages are used. Consistent with some embodiments, the real and imaginary (or reactive) portions of the measured voltages are defined with respect to the current of a transmitter, and more particularly with respect to the active transmitter. Consequently, according to such embodiments, the real portion of the measured voltage is the portion that is in phase with the current of the active transmitter and the imaginary portion of the measured voltage is the portion that is 90 degrees out of phase with the current of the active transmitter. For example, in measuring the voltage $V_{zy}$, the real portion of the measured voltage is the portion that is in phase with the active transmitter ($T_z$), and the imaginary portion of the measured voltage is the portion that 90 degrees out of phase with the active transmitter ($T_z$). Although the voltage tensor shown in equation (1) is obtained using an arrangement of three transmitters and three receivers, fewer transmitters and receivers may be used in embodiments when logging tool 102 is rotating. Moreover, consistent with other embodiments, when the transmitter coils are operating at different frequencies, one or more of the transmitter coils may be operating simultaneously and the receiver coils may differentiate the received voltages attributed to each transmitter coil by using frequency-based filtering.

The magnetic field responses in a tool coordinate system for multi-coordinate induction logging tool, such as tool 102 having coil arrangement 300 in transverse-isotropic formations with zero strike may be expressed as a matrix H having the form:

$$H = \begin{bmatrix} H_{xx} & 0 & H_{zx} \\ 0 & H_{yy} & 0 \\ H_{xz} & 0 & H_{zz} \end{bmatrix}.$$

The voltage $\bar{\bar{V}}$ is proportional to the magnetic field H and this proportionality may be accounted for during processing and, for simplicity we can refer to the voltage $\bar{\bar{V}}$ using the same equation as for the magnetic field responses in a tool coordinate system for multi-coordinate induction logging tool, such as tool 102 having coil arrangement 300 in transverse-isotropic formations with zero strike:

$$\bar{\bar{V}} = \begin{bmatrix} V_{xx} & 0 & V_{zx} \\ 0 & V_{yy} & 0 \\ V_{xz} & 0 & V_{zz} \end{bmatrix}.$$

Based on a standard Euler rotation, a relationship between the voltage $\bar{\bar{V}}^t$ in the tool coordinate system t and $\bar{\bar{V}}$ can be derived from $$\bar{\bar{V}}^t = R^T \cdot \bar{\bar{V}} \cdot R,$$

where R is the rotation matrix with respect to strike angle β:

$$R = \begin{bmatrix} \cos\beta & \sin\beta & 0 \\ -\sin\beta & \cos\beta & 0 \\ 0 & 0 & 1 \end{bmatrix}.$$

From the above equations, we can determine that the components of the voltage in $\bar{\bar{V}}^t$ in the tool coordinate system based on the voltage $\bar{\bar{V}}$ induced on coil arrangement 300 will be:

$$\begin{bmatrix} V_{xx}^t & V_{yx}^t & V_{zx}^t \\ V_{xy}^t & V_{yy}^t & V_{zy}^t \\ V_{xz}^t & V_{yz}^t & V_{zz}^t \end{bmatrix} = \quad (2)$$

$$\begin{bmatrix} V_{xx}\cos^2\beta - V_{yy}\sin^2\beta & (V_{xx}-V_{yy})\cos\beta\sin\beta & V_{xz}\cos\beta \\ (V_{xx}-V_{yy})\cos\beta\sin\beta & V_{yy}\cos^2\beta - V_{xx}\sin^2\beta & V_{xz}\sin\beta \\ V_{zx}\cos\beta & V_{zx}\sin\beta & V_{zz} \end{bmatrix}.$$

Finally, based on equation (2), we can obtain the following solutions for strike angle β:

$$\beta = \tan^{-1}\left(\frac{V_{yz}^t}{V_{xz}^t}\right) \quad (3)$$

$$\beta = \tan^{-1}\left(\frac{V_{zy}^t}{V_{zx}^t}\right) \quad (4)$$

$$\beta = \tan^{-1}\left(\frac{V_{zy}^t + V_{yz}^t}{V_{zx}^t + V_{xz}^t}\right) \quad (5)$$

$$\beta = \sin^{-1}\left(\frac{\left(\frac{V_{xy}^t + V_{yx}^t}{V_{xx}^t - V_{yy}^t}\right)}{2}\right) \quad (6)$$

$$\beta = \tan^{-1}\left(\sqrt{\frac{\left(\frac{V_{yz}^t}{V_{xz}^t}\right)^2 + \left(\frac{V_{zy}^t}{V_{zx}^t}\right)^2}{2}}\right) \quad (7)$$

These equations may be rewritten to use only the imaginary portions of the measured voltages as follows:

$$\beta = \tan^{-1}\left(\frac{\mathrm{Im}(V_{yz}^t)}{\mathrm{Im}(V_{xz}^t)}\right) \quad (8)$$

-continued $$\beta = \tan^{-1}\left(\frac{\text{Im}(V_{zy}^t)}{\text{Im}(V_{zx}^t)}\right) \quad (9)$$

$$\beta = \tan^{-1}\left(\frac{\text{Im}(V_{zy}^t) + \text{Im}(V_{yz}^t)}{\text{Im}(V_{zx}^t) + \text{Im}(V_{xz}^t)}\right) \quad (10)$$

$$\beta = \sin^{-1}\left(\frac{\left(\frac{\text{Im}(V_{xy}^t) + \text{Im}(V_{yx}^t)}{\text{Im}(V_{xx}^t) - \text{Im}(V_{yy}^t)}\right)}{2}\right) \quad (11)$$

$$\beta = \tan^{-1}\left(\sqrt{\frac{\left(\frac{\text{Im}(V_{yz}^t)}{\text{Im}(V_{xz}^t)}\right)^2 + \left(\frac{\text{Im}(V_{zy}^t)}{\text{Im}(V_{zx}^t)}\right)^2}{2}}\right) \quad (12)$$

As discussed in, for example, U.S. Pat. No. 6,393,364 to Gao et al., and assigned to the same assignee as the present disclosure, equations for calculating an approximate estimation for the dip angle α, can be derived from the magnetic field responses in a tool coordinate system for a multi-component induction logging tool in a homogenous dipping anisotropic formation as $$H_{xz}^t = \frac{\cos\beta\sin(2\alpha)}{8\pi L_M^3 \sin^2(\alpha)} ik_h L_M (e^{ik_h L_M A} - e^{ik_h L_M});$$

$$H_{zx}^t = H_{xz}^t;$$

$$H_{yz}^t = \frac{\sin\beta\sin(2\alpha)}{8\pi L_M^3 \sin^2(\alpha)} ik_h L_M (e^{ik_h L_M A} - e^{ik_h L_M});$$

$$H_{zy}^t = H_{yz}^t;$$

$$H_{yx}^t = \frac{\sin 2\beta}{8\pi L_M^3}\left[k_h^2 L_M^2 \left(e^{ik_h L_M} - \frac{e^{ik_h L_M A}}{A\lambda^2}\right) + ik_h L_M (e^{ik_h L_M A} - e^{ik_h L_M})\frac{\cos^2\alpha + 1}{\sin^2\alpha}\right];$$

and $$H_{xy}^t = H_{yx}^t,$$

where $k_h$ is the horizontal wave number determined by $k_h = \sqrt{i\omega\mu\sigma_h}$, $\sigma_h$ is the horizontal conductivity, $\sigma_v$ is the vertical conductivity, and ω is the frequency, λ is the anisotropy coefficient determined by $$\lambda = \sqrt{\frac{\sigma_h}{\sigma_v}} = \sqrt{\frac{R_v}{R_h}},$$

A is the anisotropy factor determined by $$A = \sqrt{\sin^2\alpha + \frac{\lambda^2\cos^2\alpha}{\lambda}},$$

and $L_M$ is the transmitter-receiver spacing for a bucking receiver and a main receiver.

Assuming a transmitter-receiver spacing that is approaching zero, based on the equations above, the following equation may be derived for the real part of the magnetic field components:

$$(H_{yx}^t)_R = (H_{xy}^t)_R = \frac{\sin 2\beta}{8\pi}\left[(A^2 - 1)\left(\frac{1}{\delta}\right)^3\right];$$

$$(H_{zx}^t)_R = (H_{xz}^t)_R = \frac{\cos\beta\sin 2\alpha}{8\pi\sin^2(\alpha)}\left[(A^2 - 1)\left(\frac{1}{\delta}\right)^3\right];$$

and $$(H_{zy}^t)_R = (H_{yz}^t)_R = \frac{\sin\beta\sin 2\alpha}{8\pi\sin^2(\alpha)}\left[(A^2 - 1)\left(\frac{1}{\delta}\right)^3\right],$$

where δ is the skin depth for horizontal conductivity and resistivity given as $$\delta = \sqrt{\frac{2}{\omega\mu\sigma_h}}.$$

The dip angle α can then be determined as $$\alpha = \tan^{-1}\left[\sqrt{\left(\frac{(H_{xy}^t)_R}{(H_{zx}^t)_R}\right)^2 + \left(\frac{(H_{xy}^t)_R}{(H_{zy}^t)_R}\right)^2}\right]. \quad (13)$$

Finally, because the real component of the magnetic field is identical to the imaginary or reactive component of the voltage other than a constant value, the dip angle α can be determined based on the imaginary component of the measured voltage using the following equation:

$$\alpha = \tan^{-1}\left[\sqrt{\left(\frac{\text{Im}(V_{xy}^t)}{\text{Im}(V_{zx}^t)}\right)^2 + \left(\frac{\text{Im}(V_{xy}^t)}{\text{Im}(V_{zy}^t)}\right)^2}\right]. \quad (14)$$

The formation resistivities $R_h$ and $R_v$ and formation conductivities $\sigma_h$ and $\sigma_v$ may be further estimated based on calculated dip angle α and strike angle β, calculated using the equations above, as discussed in the article by Moran and Gianzero, entitled "Effects of formation anisotropy on resistivity-logging measurements," Geophysics, vol. 41, no. 7 (July 1979), pp. 1266-1286 using the following equations:

$$\sigma_{xx} = \sigma_h + (\sigma_v - \sigma_h)\sin^2\alpha \cos^2\beta \quad (15)$$

$$\sigma_{yy} = \sigma_h + (\sigma_v - \sigma_h)\sin^2\alpha \sin^2\beta \quad (16)$$

$$\sigma_{zz} = \sigma_v - (\sigma_v + \sigma_h)\sin^2\alpha \quad (17)$$

$$\sigma_{xy} = \sigma_{yx} = (\sigma_v - \sigma_h)\sin^2\alpha \sin\beta \cos\beta \quad (18)$$

$$\sigma_{xz} = \sigma_{zx} = (\sigma_v - \sigma_h)\sin\alpha \cos\alpha \cos\beta \quad (19)$$

$$\sigma_{yz} = \sigma_{zy} = (\sigma_v - \sigma_h)\sin\alpha \cos\alpha \sin\beta \quad (20)$$

The apparent resistivities $R_{ij}$ of formation 104 are proportional to the measured voltages, as discussed in U.S. Pat. No. 6,765,386, assigned to the same assignee as the present disclosure, and can be used to determine the apparent conductivities, which are the inverse of the apparent resistivities:

$$R_{ij} = \frac{1}{\sigma_{ij}}.$$

Knowing the apparent conductivities, the determined dip angle α, and the determined strike angle β, the horizontal conductivity $\sigma_h$ and the vertical conductivity $\sigma_v$ may be estimated using equations (15)-(20). The estimated horizontal conductivity $\sigma_h$ and vertical conductivity $\sigma_v$ may be further corrected using skin effect correction and borehole effect correction to provide corrected values for the horizontal conductivity $\sigma_h$ and the vertical conductivity $\sigma_v$. Similarly, because the resistivity is the inverse of the conductivity, such that $$R_h = \frac{1}{\sigma_h}$$

and $$R_v = \frac{1}{\sigma_v},$$

the horizontal resistivity $R_h$ and vertical resistivity $R_v$ may further be determined from the estimated or corrected horizontal conductivity $\sigma_h$ and vertical conductivity $\sigma_v$. Although the equations presented herein are valid for triads arranged in an orthogonal arrangement, such as shown in FIG. 3, the equations may be used for non-orthogonal but linearly independent arrangements as well. In such non-orthogonal but linearly independent arrangements, the measured voltages would have to be first transformed to an orthogonal system. Following the transformation of the measured voltages, the equations shown herein could be used for non-orthogonal but linearly independent arrangements.

Figure 4:
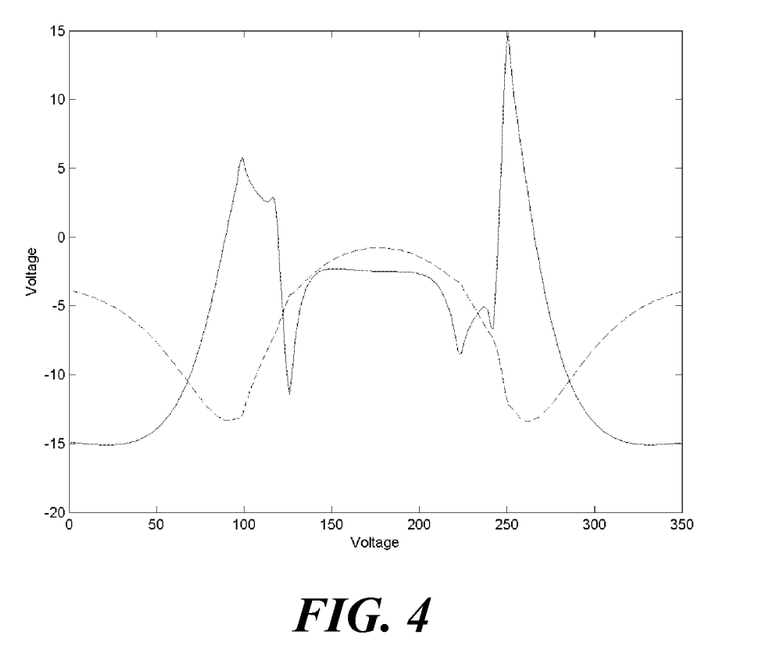
FIG. 4 is a graph illustrating the imaginary portion of a measured voltage and the real portion of the measured voltage.

As demonstrated herein, determining formation parameters using the imaginary portions of the measured voltage provide improved results over formation parameters determined using the real portions of the measured voltages, particularly in the presence of dipping bed boundaries and in anisotropic formations. FIG. 4 is a graph illustrating the imaginary portion of a measured voltage and the real portion of the measured voltage, with a distance between transmitter coils and receiver coils being about 80 inches. Although FIG. 4 illustrates the real and imaginary portions of $V_{xy}$, similar graphs may be obtained using other non-diagonal components of the measured voltages. As shown in FIG. 4, the real part of the measured voltage (shown as a solid line) exhibits sharp variations near bed boundaries while the imaginary portion (shown as a dashed line) of the measured voltages is much smoother near bed boundaries.

Figure 5:
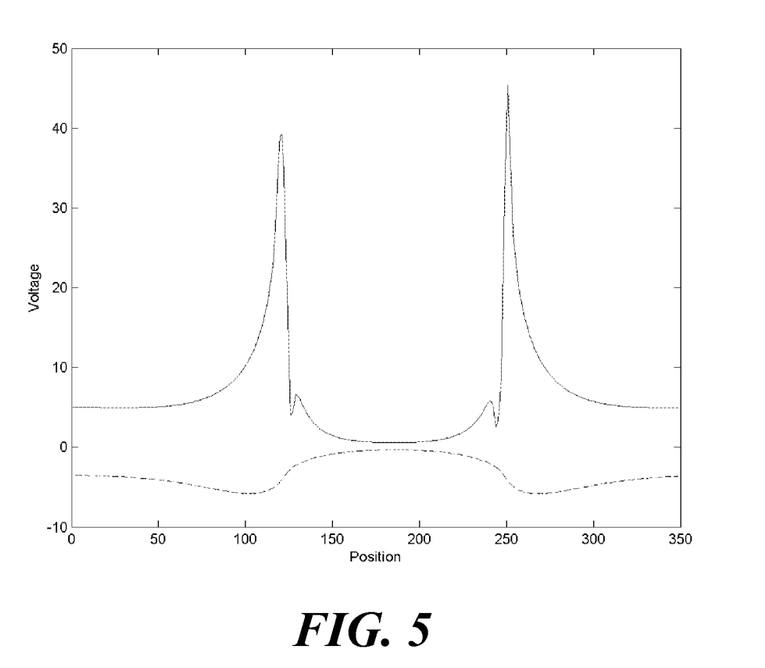
FIG. 5 is a graph illustrating the imaginary portion of a measured voltage and the real portion of the measured voltage.

FIG. 5 is a graph illustrating the imaginary portion of a measured voltage and the real portion of the measured voltage. In particular, FIG. 5 is a graph also illustrating the real and imaginary portions of $V_{xy}$ for a transmitter-receiver separation that is less than the transmitter-receiver separation shown in FIG. 4. However, the result shown in FIG. 4 is also shown in FIG. 5: the real part of the measured voltage (shown as a solid line) exhibits sharp variations near bed boundaries while the imaginary portion of the measured voltages (shown as a dashed line) is much smoother near bed boundaries.

Figure 6:
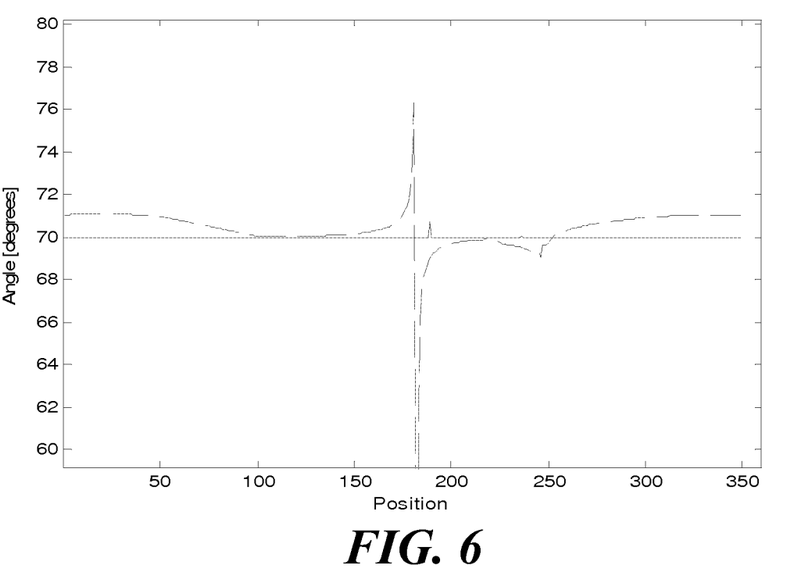
FIGS. 6, 7, and 8 are graphs comparing the strike angle $\beta$ determined using the imaginary or reactive portion of the measured voltage and the strike angle β determined using the real portion of the measured voltage.
Figure 7:
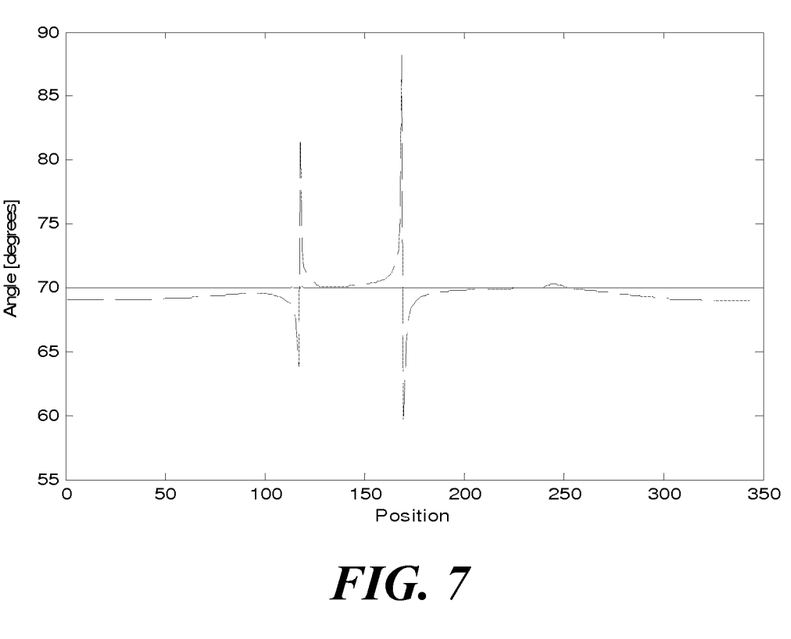
Figure 8:
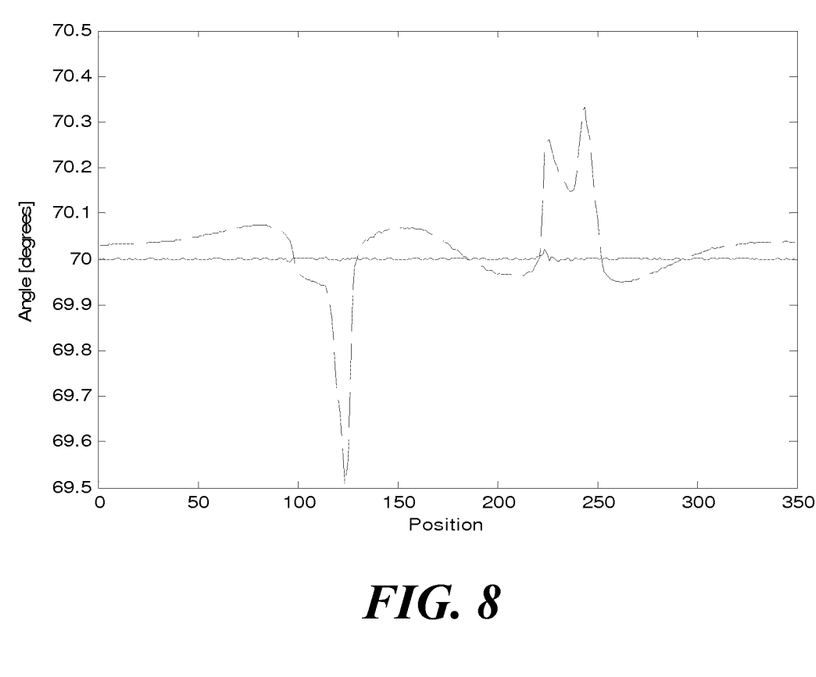

FIGS. 6, 7, and 8 are graphs illustrating the strike angle β determined using the imaginary portion of the measured voltage and the strike angle β determined using the real portion of the measured voltage. Consistent with some embodiments, the strike angle β is determined using equation (3)-(12), above. In particular, the strike angle β was determined using equations (4) and (9) in FIG. 6, using equations (3) and (8) in FIG. 7, and using equations (5) and (10) in FIG. 8. As shown in FIGS. 6-8, using the imaginary portion of the measured voltages (shown by a solid line) provides improved results over the real portions (shown using a dashed line). In particular, as shown in FIGS. 6-8, for a known strike angle β of 70°, the calculations based on the imaginary portions of the measured voltages provide very good results throughout formation 104. The accurate results are due to the decreased sensitivity of the imaginary components of the off-diagonal measured voltages to variation around bed boundaries, which removes the artifacts that are produced when the real part of the measured voltages are used. This is shown in FIGS. 6-8 by the prominence of "horns" in the strike angle calculated using the real portion, and the lack of "horns" in the strike angle calculated using the imaginary or reactive portion. Thus, the off-diagonal components of the imaginary portions of the measured voltages, which are free from direct signal influence, may be used to provide stable measurements of formation parameters in a layered anisotropic formation, including a borehole.

Figure 9:
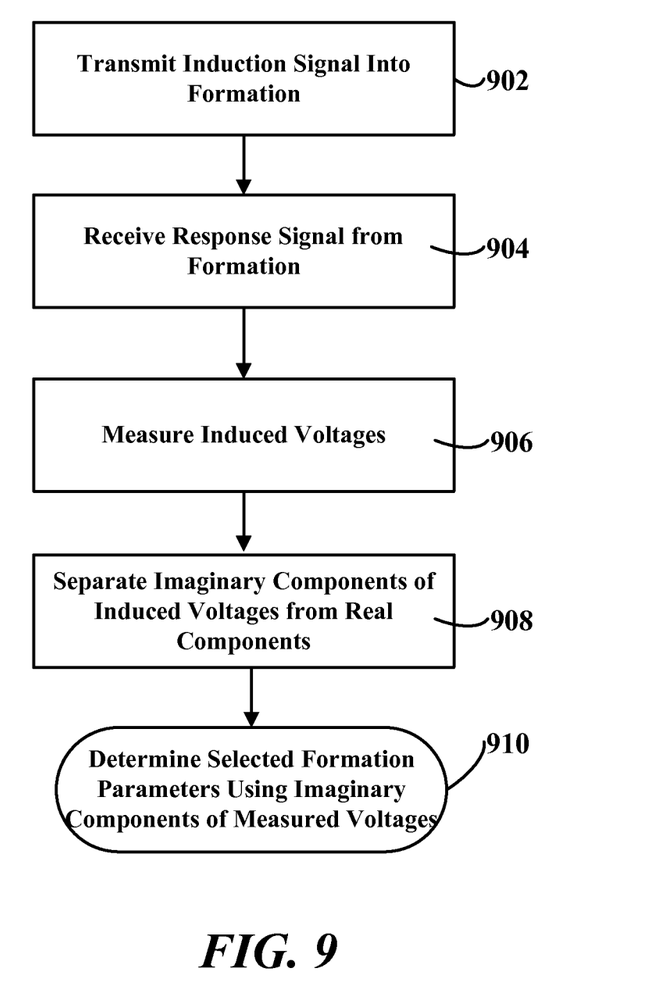
FIG. 9 is a flowchart illustrating a method for determining selected parameters of a formation using the imaginary components of measured voltages, consistent with some embodiments.

FIG. 9 is a flowchart illustrating a method for determining selected parameters of a formation using the imaginary components of measured voltages, consistent with some embodiments. The method illustrated in FIG. 9 will be discussed in conjunction with FIGS. 1 and 3, where appropriate. As shown in FIG. 9, the method begins by transmitting an induction signal into formation 104 (902). Consistent with some embodiments, the induction signal is transmitted into formation by transmitter coils $T_x$, $T_y$, and $T_z$ of coil arrangement 300. A response signal from formation 104 is then received by receiver coils $R_x$, $R_y$, and $R_z$ of coil arrangement 300 (904). Voltages induced in receiver coils $R_x$, $R_y$, and $R_z$ of coil arrangement 300 are then measured by circuitry 114 (906). Circuitry 114 then separates the imaginary or reactive components of the measured voltages from the real components of the measured voltages (908). Finally, circuitry 114 determines selected parameters of formation using the imaginary components of the measured voltages (910). As discussed herein, the selected parameters may include a strike angle β, a dip angle α, horizontal and vertical conductivities $\sigma_h$ and $\sigma_v$, and horizontal and vertical resistivities $R_h$ and $R_v$, and may be determined using the equations derived above. Further consistent with some embodiments, the selected parameters may be determined using only the off-diagonal components of the measured voltages, $V_{yx}$, $V_{xy}$, $V_{yz}$, $V_{zx}$, $V_{xz}$ and $V_{zy}$.

Consequently, embodiments described herein provide a method for determining formation parameters using the imaginary or reactive portions of a measured voltages which provide improved accuracy over the real portions particularly in the presence of bed boundaries and layered anisotropic formations including a borehole. Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. A system for determining formation parameters, comprising:
   an induction logging tool, the induction logging tool comprising:
   a plurality of transmitter coils, the plurality of transmitter coils transmitting at least one induction signal into the formation;

a plurality of receiver coils, each of the receiver coils being spaced apart from the transmitter coils by a predetermined distance and receiving a response signal from the formation, the response signal being induced by the at least one induction signal; and circuitry coupled to the induction logging tool, the circuitry determining voltages induced in the plurality of receiver coils by the response signal, wherein the circuitry is further configured to separate real portions of the determined voltages from imaginary portions of the determined voltages and determine formation parameters using only imaginary portions of the measured voltages, wherein the imaginary portions of the determined voltages are ninety degrees out of phase with a current on the transmitter coils, wherein the selected formation parameters include at least one of a horizontal resistivity $R_h$, a vertical resistivity $R_v$, a horizontal conductivity $\sigma_h$, and a vertical conductivity $\sigma_v$.

2. The system of claim 1, wherein:
the determined voltages have the form of $\bar{\bar{V}} = V_{ij}$, wherein $V_{ij}$ is a voltage induced on the j-th receiver coil by the i-th transmitter coil; and, optionally
the plurality of receiver coils include three receiver coils oriented in three linearly independent directions, generally referred to as an x direction, a y direction, and a z direction, and the plurality of transmitter coils include three transmitter coils also oriented in the x, y, and z directions, such that the determined voltages have the form $$\bar{\bar{V}} = \begin{bmatrix} V_{xx} & V_{xy} & V_{xz} \\ V_{yx} & V_{yy} & V_{yz} \\ V_{zx} & V_{zy} & V_{zz} \end{bmatrix};$$

and, optionally
the x direction, the y direction and the z direction are orthogonal to each other.

3. The system of claim 2, wherein the x direction, the y direction, and the z direction are not orthogonal to each other and the determined voltages are transformed to an orthogonal orientation.

4. The system of claim 2, wherein the dip angle $\alpha$ is determined using the equation $$\alpha = \tan^{-1}\left[\sqrt{\left(\frac{\operatorname{Im}(V_{xy}^t)}{\operatorname{Im}(V_{zx}^t)}\right)^2 + \left(\frac{\operatorname{Im}(V_{xy}^t)}{\operatorname{Im}(V_{zy}^t)}\right)^2}\right],$$

wherein $\operatorname{Im}(V_{ij}^t)$ is the imaginary component of the voltage induced on the j-th receiver by the i-th transmitter in a coordinate system t of the induction logging tool.

5. The system of claim 1, where in the strike angle $\beta$ is determined using at least one of the following equations:

$$\beta = \tan^{-1}\left(\frac{\operatorname{Im}(V_{yz}^t)}{\operatorname{Im}(V_{xz}^t)}\right);$$

$$\beta = \tan^{-1}\left(\frac{\operatorname{Im}(V_{zy}^t)}{\operatorname{Im}(V_{zx}^t)}\right);$$

$$\beta = \tan^{-1}\left(\frac{\operatorname{Im}(V_{zy}^t) + \operatorname{Im}(V_{yz}^t)}{\operatorname{Im}(V_{zx}^t) + \operatorname{Im}(V_{xz}^t)}\right);$$

$$\beta = \sin^{-1}\left(\frac{\left(\frac{\operatorname{Im}(V_{xy}^t) + \operatorname{Im}(V_{yx}^t)}{\operatorname{Im}(V_{xx}^t) + \operatorname{Im}(V_{yy}^t)}\right)}{2}\right);$$

and $$\beta = \tan^{-1}\left(\sqrt{\frac{\left(\frac{\operatorname{Im}(V_{yz}^t)}{\operatorname{Im}(V_{xz}^t)}\right)^2 + \left(\frac{\operatorname{Im}(V_{zy}^t)}{\operatorname{Im}(V_{zx}^t)}\right)^2}{2}}\right),$$

wherein $\operatorname{IM}(V_{ij}^t)$ is the imaginary component of the voltage induces on the j-th receiver by the Ith transmitter in a coordiante system t of the induction logging tool.

6. The system of claim 1, wherein the formation parameters are determined at locations around edges of a borehole or at locations at bed boundaries.

7. The system of claim 1, wherein the formation parameters are determined for a layered anisotropic formation.

8. The system of claim 1, wherein the circuitry comprises at least one of the following: a processor coupled to the induction logging tool, a processor located within the induction logging tool, and circuitry configured to separate imaginary components of the measured voltages from real components of the measured voltages and to determine selected parameters of the formation using the imaginary components of the measured voltages.

9. The system of claim 1, wherein the plurality of transmitter coils alternate transmitting the at least one induction signal such that only one transmitter coil of the plurality of transmitter coils is active at a time.

10. The system of claim 1, wherein the plurality of transmitter coils each transmit at least one induction signal each having a different frequency.

11. A method of determining selected parameters of a formation, comprising:
transmitting, by a plurality of transmitters of an induction logging tool, at least one induction signal simultaneously into the formation;
receiving, by a plurality of receivers of the induction logging tool, a response signal from the formation, the response signal being induced by the at least one induction signal;
measuring voltages induced in the plurality of receivers by the response signal;
separating, by circuitry, imaginary components of the measured voltages from real components of the measured voltages, wherein the imaginary components of the determined voltages are ninety degrees out of phase with a current on the at least one transmitter; and
determining, by the circuitry, selected parameters of the formation using only the imaginary components of the measured voltages,
wherein the selected formation parameters include at least one of a horizontal resistivity $R_h$, a vertical resistivity $R_v$, a horizontal conductivity $\alpha_h$, and a vertical conductivity $\alpha_v$.

12. The method of claim 11, wherein:
the measured voltages have the form of $\bar{\bar{V}}=V_{ij}$, wherein $V_{ij}$ is a voltage induced on the j-th receiver by the i-th transmitter; and, optionally
the plurality of receivers include three receivers oriented in three linearly independent directions, generally referred to as an x direction, a y direction, and a z direction, and the plurality of transmitters include three transmitters also oriented in the x, y, and z directions, such that the measured voltages have the form $$\bar{\bar{V}} = \begin{bmatrix} V_{xx} & V_{xy} & V_{xz} \\ V_{yx} & V_{yy} & V_{yz} \\ V_{zx} & V_{zy} & V_{zz} \end{bmatrix};$$

and, optionally
the x direction, the y direction and the z direction are orthogonal to each other.

13. The method of claim 12, wherein the x direction, the y direction, and the z direction are not orthogonal to each other and the determined voltages are transformed to an orthogonal orientation.

14. The method of claim 12, wherein the dip angle α is determined using the equation $$\alpha = \tan^{-1}\left[\sqrt{\left(\left(\frac{\operatorname{Im}(V_{xy}^t)}{\operatorname{Im}(V_{zx}^t)}\right)^2 + \left(\frac{\operatorname{Im}(V_{xy}^t)}{\operatorname{Im}(V_{zy}^t)}\right)^2\right)}\right],$$

wherein $\operatorname{Im}(V_{ij}^t)$ is the imaginary component of the voltage induced on the j-th receiver by the i-th transmitter in a coordinate system t of the induction logging tool.

15. The method of claim 11, wherein the strike angle p is determined using at least one of the following equations:

$$\beta = \tan^{-1}\left(\frac{\operatorname{Im}(V_{yz}^t)}{\operatorname{Im}(V_{xz}^t)}\right);$$

$$\beta = \tan^{-1}\left(\frac{\operatorname{Im}(V_{zy}^t)}{\operatorname{Im}(V_{zx}^t)}\right);$$

$$\beta = \tan^{-1}\left(\frac{\operatorname{Im}(V_{zy}^t) + \operatorname{Im}(V_{yz}^t)}{\operatorname{Im}(V_{zx}^t) + \operatorname{Im}(V_{xz}^t)}\right);$$

$$\beta = \sin^{-1}\left(\frac{\left(\frac{\operatorname{Im}(V_{xy}^t) + \operatorname{Im}(V_{yx}^t)}{\operatorname{Im}(V_{xx}^t) + \operatorname{Im}(V_{yy}^t)}\right)}{2}\right);$$

and $$\beta = \tan^{-1}\left(\sqrt{\frac{\left(\frac{\operatorname{Im}(V_{yz}^t)}{\operatorname{Im}(V_{xz}^t)}\right)^2 + \left(\frac{\operatorname{Im}(V_{zy}^t)}{\operatorname{Im}(V_{zx}^t)}\right)^2}{2}}\right),$$

wherein $\operatorname{IM}(V_{ij}^t)$ is the imaginary component of the voltage induced on the j-th receiver by the i-th transmittor in a coordinator system t of the induction logging tool.

16. The method of claim 11, wherein the selected parameters are determined at locations around edges of a borehole or at locations at bed boundaries.

17. The method of claim 11, wherein the selected parameters are determined for a layered anisotropic formation.

18. The method of claim 11, wherein the circuitry comprises at least one of the following: a processor coupled to the induction logging tool, a processor located within the induction logging tool, and circuitry configured to separate imaginary components of the measured voltages from real components of the measured voltages and to determine selected parameters of the formation using the imaginary components of the measured voltages.

19. The method of claim 11, wherein transmitting at least one induction signal into the formation comprises alternatingly transmitting the at least one induction signal such that only one transmitter coil of the plurality of transmitter coils is active at a time.

20. The method of claim 11, wherein transmitting the at least one induction signal into the formation comprises transmitting an induction signal from each transmitter coil such that each induction signal has a different frequency.

* * * * *